US012412694B2

(12) United States Patent
Mizukami et al.

(10) Patent No.: US 12,412,694 B2
(45) Date of Patent: Sep. 9, 2025

(54) INDUCTOR COMPONENT

(71) Applicant: Murata Manufacturing Co., Ltd., Kyoto-fu (JP)

(72) Inventors: Takashi Mizukami, Nagaokakyo (JP); Hiromi Miyoshi, Nagaokakyo (JP); Keiichi Yoshinaka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/494,370

(22) Filed: Oct. 25, 2023

(65) Prior Publication Data

US 2024/0055174 A1 Feb. 15, 2024

Related U.S. Application Data

(63) Continuation of application No. 16/777,778, filed on Jan. 30, 2020, now Pat. No. 11,837,395.

(30) Foreign Application Priority Data

Feb. 15, 2019 (JP) ................................ 2019-025629

(51) Int. Cl.
*H01F 27/28* (2006.01)
*H01F 17/00* (2006.01)
(Continued)

(52) U.S. Cl.
CPC ..... *H01F 27/2804* (2013.01); *H01F 17/0013* (2013.01); *H01F 27/2823* (2013.01);
(Continued)

(58) Field of Classification Search
CPC ......... H01F 27/2804; H01F 2027/2809; H01F 17/0013; H01F 17/0006; H01F 5/003; H01F 27/292; H01F 27/2823; H01F 27/32
(Continued)

(56) References Cited

U.S. PATENT DOCUMENTS

2003/0098496 A1* 5/2003 Sugiyama ............. H01F 41/045 257/516
2018/0315540 A1* 11/2018 Kim ........................ H01F 27/29

FOREIGN PATENT DOCUMENTS

CN 1421879 A 6/2003
CN 1577645 A 2/2005
(Continued)

OTHER PUBLICATIONS

An Office Action mailed by China National Intellectual Property Administration on Jun. 22, 2021 which corresponds to Chinese Patent Application No. 202010088272.7 and is related to U.S. Appl. No. 16/777,778 with English language translation.
(Continued)

*Primary Examiner* — Tszfung J Chan
(74) *Attorney, Agent, or Firm* — Studebaker Brackett PLLC

(57) ABSTRACT

An inductor component includes a substantially rectangular parallelepiped device body including a first lateral surface and includes a coil conductor layer formed into a spiral wound more than one turn on a main surface parallel to the first lateral surface inside the device body. In the coil conductor layer, a wiring spacing between two wiring portions adjacent to each other (straight portions) in a first direction from an inner side portion to an outer side portion of the coil conductor layer differs from a wiring spacing of two wiring portions adjacent to each other (curved portions) in a second direction from the inner side portion to the outer side portion of the coil conductor layer, the second direction differing from the first direction.

15 Claims, 9 Drawing Sheets

(51) Int. Cl.
*H01F 27/29* (2006.01)
*H01F 27/32* (2006.01)
*H01F 41/04* (2006.01)

(52) U.S. Cl.
CPC ........... *H01F 27/292* (2013.01); *H01F 27/32* (2013.01); *H01F 41/041* (2013.01); *H01F 2027/2809* (2013.01)

(58) Field of Classification Search
USPC .................................................. 336/200, 232
See application file for complete search history.

(56) References Cited

FOREIGN PATENT DOCUMENTS

| | | | | | |
|---|---|---|---|---|---|
| EP | 1308969 | A1 | * | 5/2003 | ............. H01F 5/003 |
| JP | 2002299120 | A | * | 10/2002 | |
| JP | 2004-047849 | A | | 2/2004 | |
| JP | 2005294486 | A | * | 10/2005 | |
| JP | 2010040701 | A | * | 2/2010 | |
| JP | 2010287722 | A | * | 12/2010 | |
| JP | 2011015292 | A | * | 1/2011 | |
| JP | 2013-153009 | A | | 8/2013 | |
| JP | 2019-016618 | A | | 1/2019 | |
| KR | 2010054217 | A | * | 5/2010 | |
| WO | 2011/145490 | A1 | | 11/2011 | |

OTHER PUBLICATIONS

An Office Action; "Notice of Reasons for Refusal," mailed by the Japanese Patent Office on Oct. 19, 2021, which corresponds to Japanese Patent Application No. 2019-025629 and is related to U.S. Appl. No. 16/777,778 with English translation.

* cited by examiner

INDUCTOR COMPONENT

CROSS-REFERENCE TO RELATED APPLICATION

This application is a Continuation of U.S. patent application Ser. No. 16/777,778 filed Jan. 30, 2020, which claims benefit of priority to Japanese Patent Application No. 2019-025629, filed Feb. 15, 2019, the entire content of which is incorporated herein by reference.

BACKGROUND

Technical Field

The present disclosure relates to an inductor component.

Background Art

Electronic components have been incorporated into a variety of electronic equipment. As one such electronic component, for example, a multilayer inductor component is known, as described, for example, in Japanese Unexamined Patent Application Publication No. 2013-153009.

Regarding electronic equipment, there has been a demand for miniaturized inductor components capable of handling high-frequency signals in accordance with the higher frequency of signals used for electronic equipment such as cellular phones. Simply miniaturizing an inductor component decreases the wiring cross section and the inner coil diameter of the inductor component. Accordingly, the maximum values of an obtainable inductance value (L value) and an obtainable Q value are reduced. Thus, in miniaturized inductor components for high-frequency signals, a method for improving the efficiency in obtaining characteristics such as an L value and a Q value per unit volume will be important in the future.

Specifically, for example, to increase an inductance value using an inductor component having a configuration as in the case of Japanese Unexamined Patent Application Publication No. 2013-153009, the number of coil conductor layers needs to be increased. In such a case, the size of a multilayer body is increased in the layering direction, and accordingly the outward shape size of the inductor component is increased; thus, the miniaturization cannot be achieved. In an inductor component as in Japanese Unexamined Patent Application Publication No. 2013-153009, when the number of turns per coil conductor layer is set to one or more to increase an inductance value without modifying the outward shape of the inductor component, a Q value is reduced due to interference of the magnetic fluxes generated from two wirings parallel to each other in each coil conductor layer.

SUMMARY

Accordingly, the present disclosure provides an inductor component in which the efficiency in obtaining characteristics is improved.

According to a preferred embodiment of the present disclosure, an inductor component includes a substantially rectangular parallelepiped device body including a first lateral surface and includes a coil conductor layer formed into a spiral wound more than one turn on a main surface parallel to the first lateral surface inside the device body. In the coil conductor layer, a wiring spacing between two wiring portions adjacent to each other in a first direction from an inner side portion of the coil conductor layer to an outer side portion of the coil conductor layer differs from a wiring spacing between two wiring portions adjacent to each other in a second direction from the inner side portion of the coil conductor layer to the outer side portion of the coil conductor layer, the second direction differing from the first direction.

At each pair of the wiring portions adjacent to each other, the magnetic fluxes generated by currents flowing through the wiring portions cancel each other out. The above configuration includes a portion at which the magnetic flux cancellation between the adjacent wiring portions is reduced because the wiring spacings between the pairs of the adjacent wiring portions differ from each other. Thus, the efficiency in obtaining characteristics is improved. The term "wiring spacing" mentioned above means the shortest distance between two adjacent wiring portions.

An embodiment according to the present disclosure can provide an inductor component in which the efficiency in obtaining characteristics is improved.

Other features, elements, characteristics and advantages of the present disclosure will become more apparent from the following detailed description of preferred embodiments of the present disclosure with reference to the attached drawings.

DETAILED DESCRIPTION

Hereinafter, an embodiment will be described.

In the accompanying drawings, elements may be enlarged to facilitate understanding. The dimensional ratios of elements may differ from the actual dimensional ratios or from the dimensional ratios of other figures.

Figure 1:
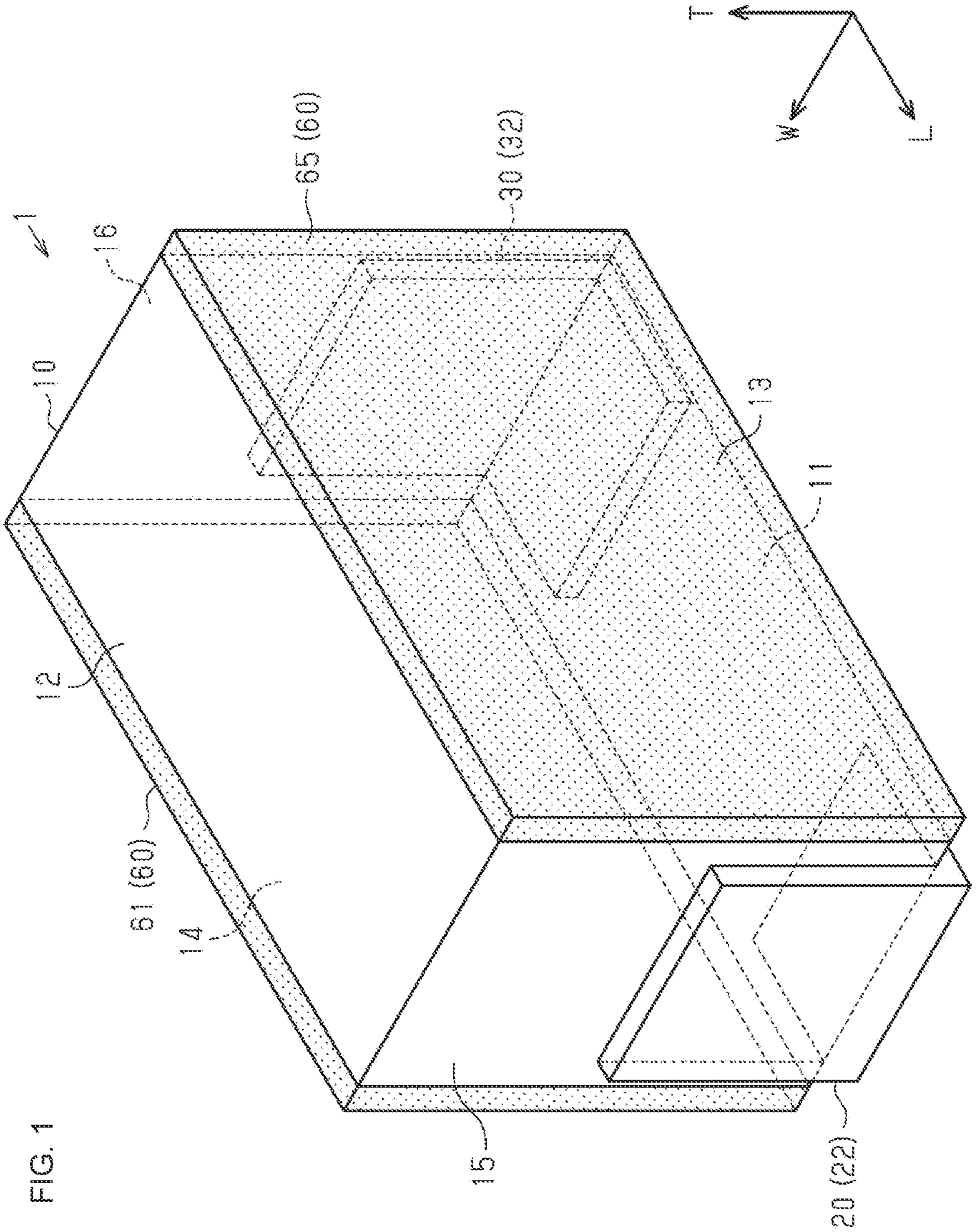
FIG. 1 is a schematic perspective view of an inductor component.

FIG. 1 is a schematic perspective view of an outward appearance of an inductor component 1. The inductor component 1 includes a device body 10. The device body 10 is a base body in which the elements of the inductor component 1 are arranged and has a substantially rectangular parallelepiped shape. In the present specification, the rectangular parallelepiped shape includes a rectangular parallelepiped in which corners and edge lines are chamfered and a rectangular parallelepiped in which corners and edge lines are rounded. In addition, the rectangular parallelepiped shape may have protrusions and depressions formed in a portion or all of a main surface and lateral surfaces and may incline to a certain extent while the surfaces opposite to each other are not perfectly parallel to each other.

The device body 10 includes a mounting surface 11. When the inductor component 1 is mounted at a circuit board, the mounting surface 11 is opposite to the circuit board. The device body 10 includes a top surface 12 parallel to the mounting surface 11. The device body 10 includes two pairs of surfaces orthogonal to the mounting surface 11. Surfaces included in one pair of the two pairs of surfaces are referred to as a first lateral surface 13 and a second lateral surface 14, and surfaces of the other pair are referred to as a first end surface 15 and a second end surface 16. The first end surface 15 and the second end surface 16 are orthogonal to the first lateral surface 13 and the second lateral surface 14.

In the present specification, a direction orthogonal to the top surface 12 and the mounting surface 11 is referred to as the height direction, a direction orthogonal to the first lateral surface 13 and the second lateral surface 14 is referred to as the width direction, and a direction orthogonal to the first end surface 15 and the second end surface 16 is referred to as the length direction. The above directions are specifically illustrated in FIG. 1, with the length direction as L, the height direction as T, and the width direction as W. In addition, the dimension in the width direction is referred to as width, the dimension in the height direction is referred to as height, and the dimension in the length direction is referred to as length. Hereinafter, in the height direction of the inductor component 1, the mounting surface 11 side is referred to as a lower side, and the top surface 12 side is referred to as an upper side.

Figure 2:
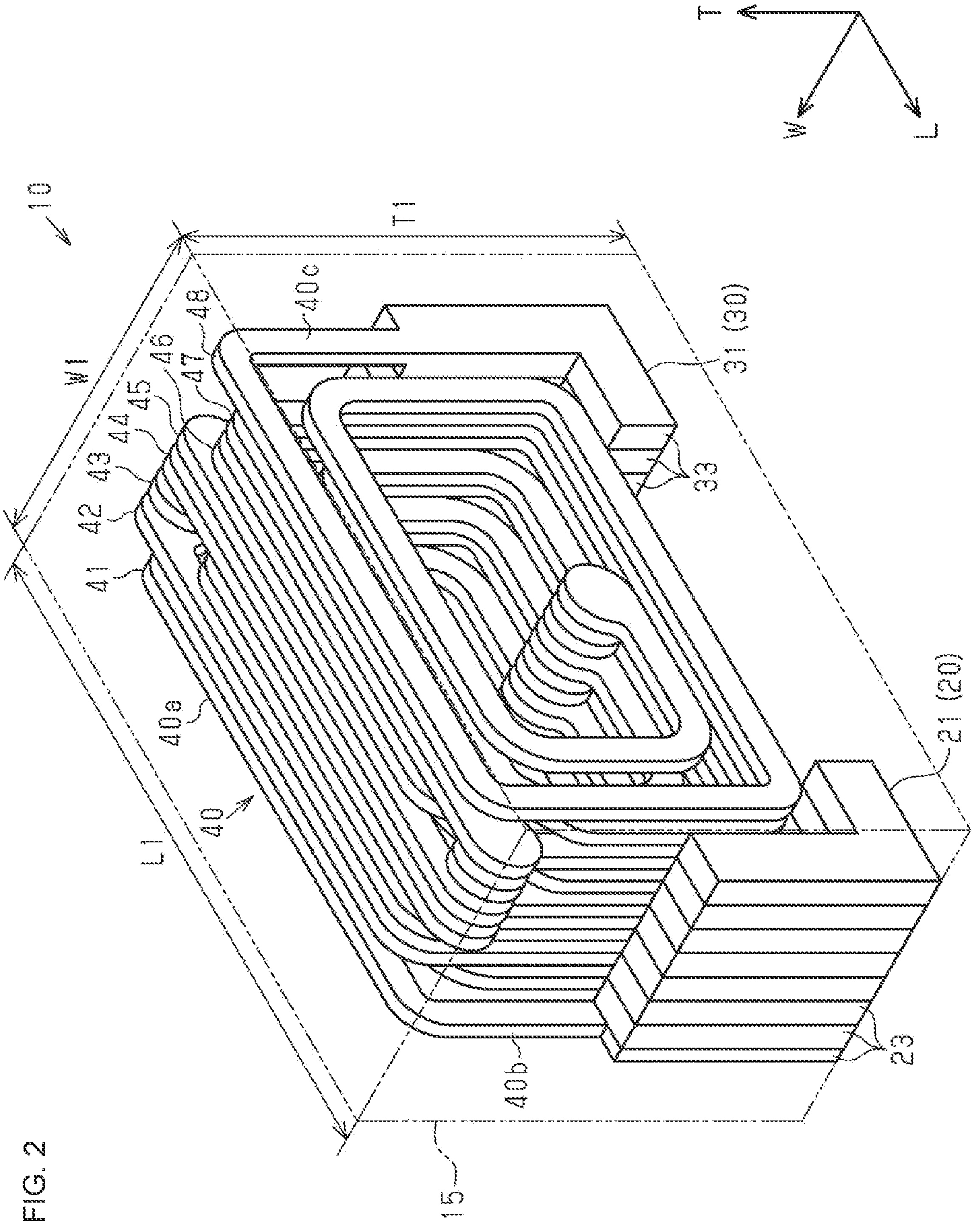
FIG. 2 is a schematic, see-through perspective view of the inductor component.

In the device body 10 illustrated in FIG. 2, the dimension in the length direction L (length L1) is preferably more than 0 mm and 1.0 mm or less (i.e., from more than 0 mm to 1.0 mm). For example, the length L1 is 0.6 mm. In the device body 10, the dimension in the width direction W (width W1) is preferably more than 0 mm and 0.6 mm or less (i.e., from more than 0 mm to 0.6 mm). The width W1 is preferably 0.36 mm or less, more preferably 0.33 mm or less. For example, the width W1 of the device body 10 is 0.3 mm. In the device body 10, the dimension in the height direction T (height T1) is preferably more than 0 mm and 0.8 mm or less (i.e., from more than 0 mm to 0.8 mm). For example, the height T1 of the device body 10 is 0.4 mm.

The inductor component 1 includes a first outer electrode 20 and a second outer electrode 30 that are exposed at respective surfaces of the device body 10. The first outer electrode 20 is exposed at the mounting surface 11 of the device body 10. In addition, the first outer electrode 20 is exposed at the first end surface 15 of the device body 10. The second outer electrode 30 is exposed at the mounting surface 11 of the device body 10. In addition, the second outer electrode 30 is exposed at the second end surface 16 of the device body 10. In other words, the first outer electrode 20 and the second outer electrode 30 are exposed at the mounting surface 11. That is, in the device body 10, the surface at which the first outer electrode 20 and the second outer electrode 30 are exposed is the mounting surface 11.

In the first end surface 15, the first outer electrode 20 is formed in such a manner that the length thereof from the mounting surface 11 of the device body 10 is substantially equal to half the height of the device body 10. The first outer electrode 20 is formed at a substantial center of the device body 10 in the width direction W and has a width smaller than the width of the device body 10, for example, 0.24 mm. In the mounting surface 11, for example, the first outer electrode 20 is formed to have a length of 0.15 mm from the first end surface 15. In the second end surface 16, the second outer electrode 30 is formed in such a manner that the length thereof from the mounting surface 11 of the device body 10 is substantially equal to half the height of the device body 10. In the present embodiment, the second outer electrode 30 is formed at a substantial center of the device body 10 in the width direction W and has a width smaller than the width of the device body 10, for example, 0.24 mm. In the mounting surface 11, for example, the second outer electrode 30 is formed to have a length of 0.15 mm from the second end surface 16. The widths of the first outer electrode 20 and the second outer electrode 30 may be equal to the width of the device body 10.

Figure 3:
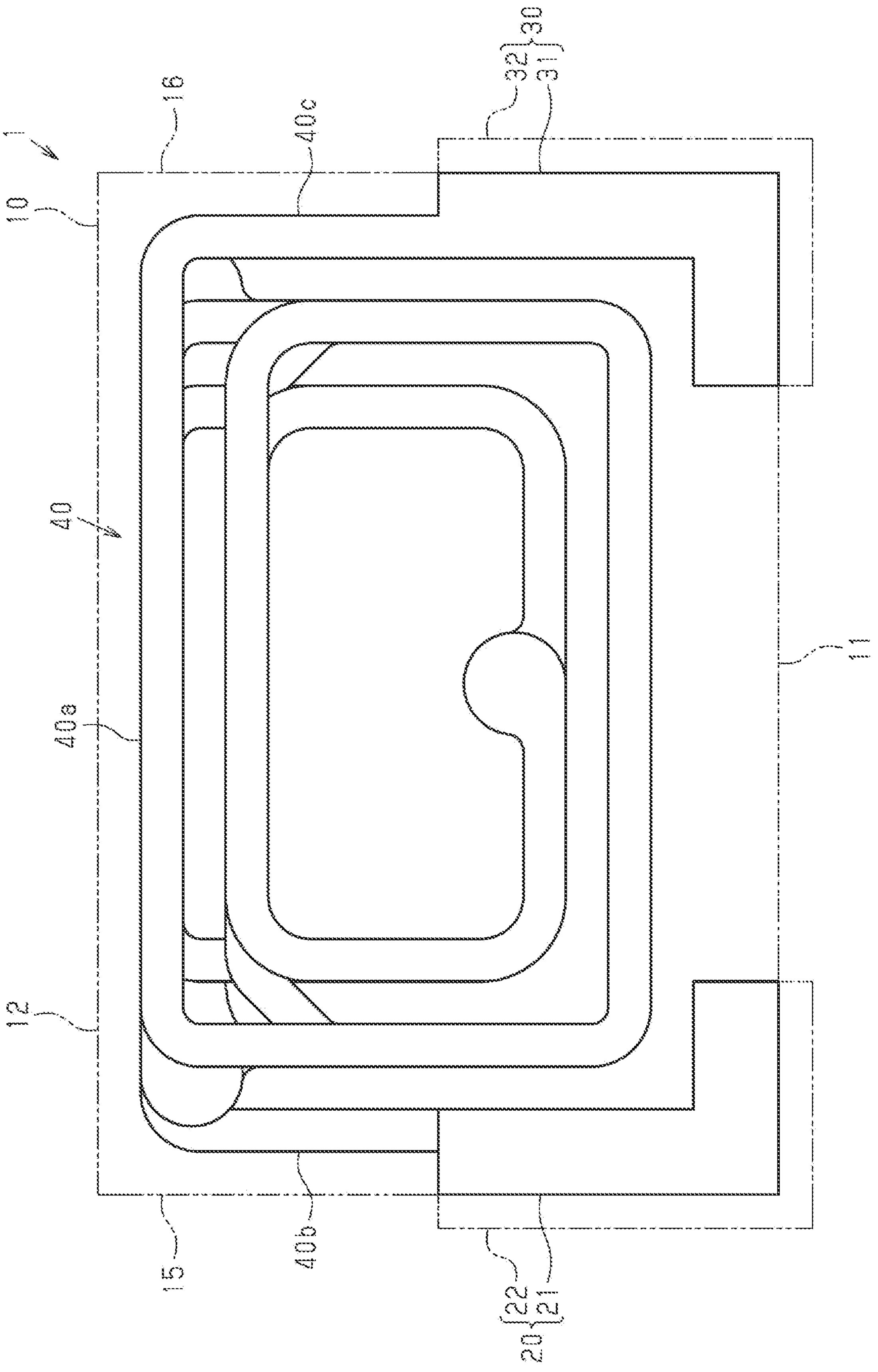
FIG. 3 is a schematic, see-through side view of the inductor component.
Figure 4:
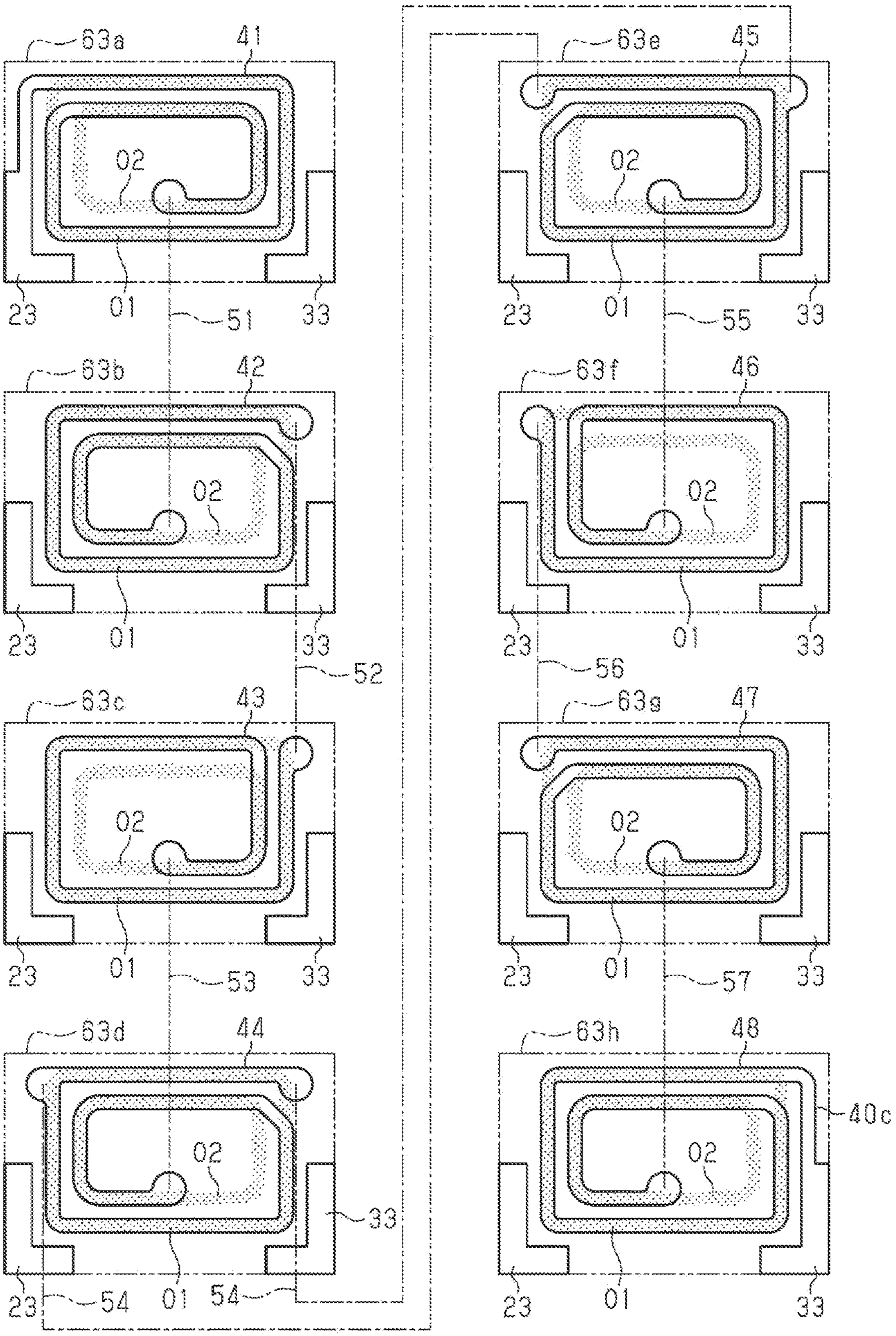
FIG. 4 is a series of plan views of individual insulator layers in which respective coil conductor layers and respective outer electrode layers are illustrated.

FIGS. 2, 3, and 4 illustrate a configuration of each portion including the internal structure of the inductor component 1. The inductor component 1 includes a coil 40 provided inside the device body 10. In FIG. 2 and FIG. 3, the coil 40 positioned inside the device body 10 and underlying layers 21 and 31, described below, of the first outer electrode 20 and the second outer electrode 30 are illustrated by solid lines, and the device body 10 is illustrated by two-dot chain lines. To facilitate the understanding of an inner portion of the device body 10, covering layers 22 and 32, described below and positioned outside the device body 10, of the first outer electrode 20 and the second outer electrode 30 are omitted from FIG. 2.

Figure 5:
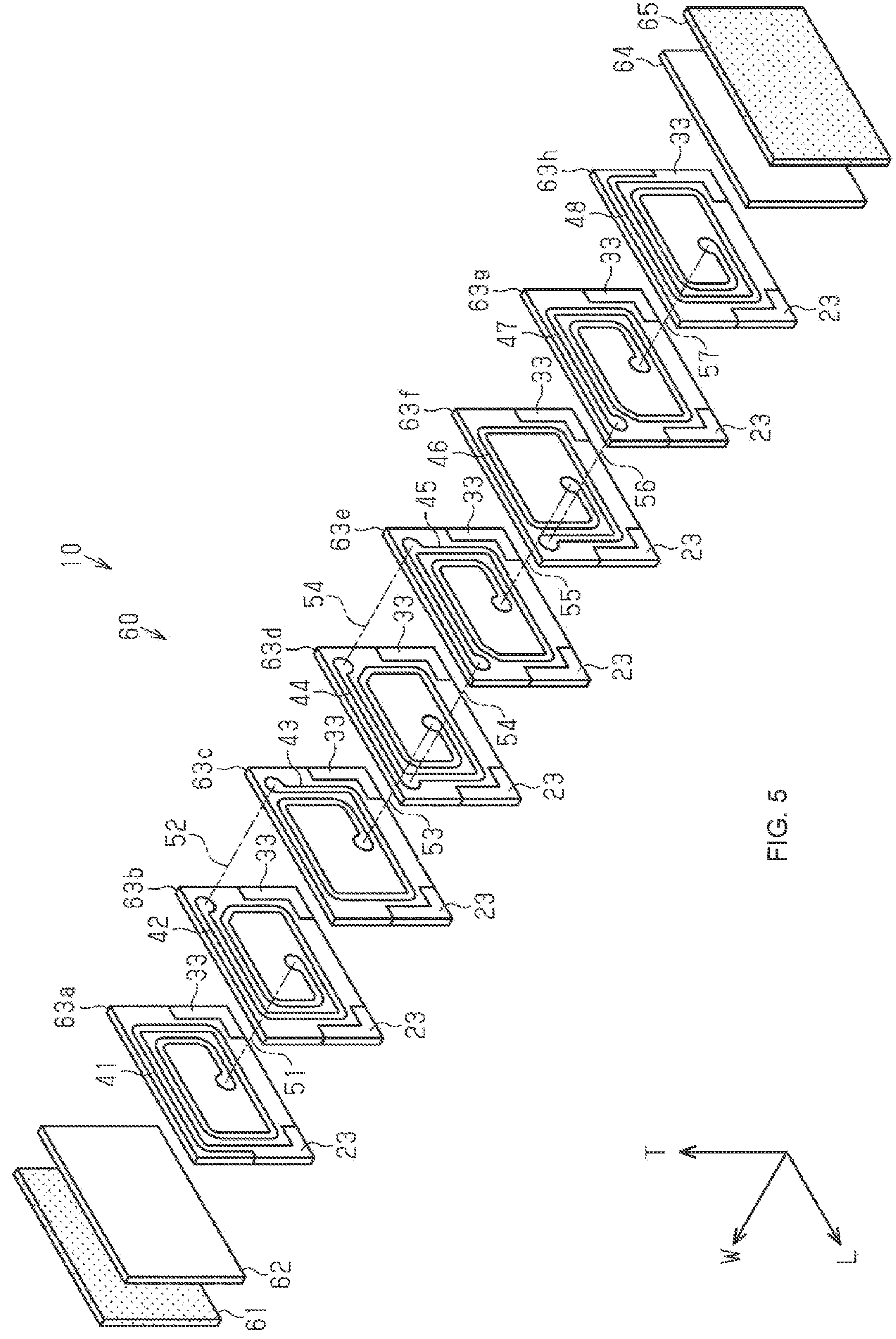
FIG. 5 is an exploded perspective view of the inductor component.

As illustrated in FIG. 5, the device body 10 includes a plurality of plate-like insulator layers 60 having rectangular main surfaces that are parallel to the first lateral surface 13. The device body 10 has a substantially rectangular parallelepiped shape formed in such a manner that the plurality of insulator layers 60 are layered in the width direction W that is orthogonal to the first lateral surface 13. Accordingly, the width direction W corresponds to the layering direction of the insulator layers 60. Each of the length direction L and the height direction T orthogonal to the width direction W is one of the in-layer directions orthogonal to the layering direction. The insulator layers are indicated by respective reference signs differentiating each insulator layer, such as 61, 62, 63*a* to 63*h*, 64, and 65. In the following description, the reference sign 60 will be used when the plurality of insulator layers are not differentiated from each other, and the reference signs 61, 62, 63*a* to 63*h*, 64, and 65 will be used when the plurality of insulator layers are differentiated from each other.

The main surfaces of the insulator layers 60 may incline to a certain extent without being perfectly parallel to the first lateral surface 13 and may have protrusions and depressions in the surfaces due to a manufacturing process including conductor layer forming, multilayering, firing, and solidification. Even in such cases, the main surfaces of the insulator layers 60 are still defined to be substantially parallel to the first lateral surface 13. In addition, because of the manufacturing process including firing, solidification, and the like, the interfaces between the layers of the insulator layers 60 may not be obvious.

Preferable examples of materials for the insulator layers 60 are materials having a relative permeability of 2 or less, such as nonmagnetic materials such as glass as borosilicate glass, alumina, zirconia, and polyimide resin. More preferable materials for the insulator layers 60 have a relative permeability close to 1. However, depending on a use mode of the inductor component 1, the insulator layers 60 may be formed of a magnetic material such as ferrite or a magnetic powder containing resin.

The colors of the insulator layers 61 and 65 differ from the colors of the insulator layers 62, 63*a* to 63*h*, and 64. In FIG. 1, the insulator layers 61 and 65 are indicated by a hatch pattern and solid lines to be differentiated from the other insulator layers. Thus, when the inductor component 1 is mounted, rolling over or the like of the inductor component 1 can be detected. The colors of the insulator layers 61 and 65 may be the same as the colors of the insulator layers 62, 63*a* to 63*h*, and 64. When the length L1, the width W1, and the height T1 differ from each other, rolling over or the like can be detected even though the colors of such insulator layers are the same.

The first outer electrode 20 and the second outer electrode 30 are input-output terminals of electric signals for the coil 40 inside the inductor component 1 and are to be the portions connected to a circuit wiring when the inductor component 1 is mounted at the circuit board.

As illustrated in FIG. 3, the first outer electrode 20 according to the present embodiment includes the underlying layer 21 and the covering layer 22. The underlying layer 21 is embedded in the device body 10. The underlying layer 21 is formed in an L-shape when viewed in the width direction W. The second outer electrode 30 according to the present embodiment includes the underlying layer 31 and the covering layer 32. The underlying layer 31 is embedded in the device body 10. The underlying layer 31 is formed in an L-shape when viewed in the width direction W.

The first outer electrode 20 and the second outer electrode 30 are exposed at only the surfaces, parallel to the width direction W, of the surfaces of the device body 10. Thus, the magnetic flux passing around the periphery of the coil 40 in the width direction W is not blocked by the first outer electrode 20 or the second outer electrode 30. When the inductor component 1 is mounted at the circuit board, the above-described magnetic flux is parallel to a main surface of the circuit board and is thus less likely to be blocked by the circuit wiring of the circuit board. Accordingly, the Q value of the inductor component 1 can be improved.

Materials for the covering layer 22 and 32 may be materials having high solderability resistance or high wettability. For example, metals such as nickel (Ni), copper (Cu), tin (Sn), and gold (Au), or alloys containing such metals can be used. Each covering layer can be formed of a plurality of layers. For example, each of the covering layers 22 and 32 includes a Ni plating layer covering the first outer electrode 20 and the second outer electrode 30 and a Sn plating layer covering the surface of the Ni plating layer. The covering layers 22 and 32 suppress oxidation of the surfaces of the first outer electrode 20 and the second outer electrode 30. The covering layers 22 and 32 may protrude from the device body 10 or may form the same surfaces as the respective surfaces of the device body 10.

As illustrated in FIG. 2, the underlying layer 21 includes a plurality of outer conductor layers 23 that are provided at respective corners of the insulator layers 63*a* to 63*h* and that are aligned in the width direction W. The plurality of outer conductor layers 23 are directly connected to each other in the width direction W and form a single underlying layer 21. Similarly, the underlying layer 31 includes a plurality of outer conductor layers 33 aligned in the width direction W. The plurality of outer conductor layers 33 are directly connected to each other in the width direction W and form a single underlying layer 31. None of the outer conductor layers 23 and 33 are limited to a case illustrated in FIG. 2, in which the adjacent surfaces are entirely in contact with each other in the width direction, and the outer conductor layers 23 and 33 may be formed on the main surfaces of the insulator layers 63*a* to 63*h* without being in a direct contact with each other. In such a case, in each assembly of the outer conductor layers 23 and 33, the outer conductor layers may be electrically connected to each other in the width direction W by conductor layers or vias that extend through the insulator layers 63*b* to 63*h* positioned between the outer conductor layers 23 and 33, or the outer conductor layers may not be completely electrically connected to each other in each assembly of the outer conductor layers 23 and 33.

As illustrated in FIG. 3, a first end of the coil 40 is connected to the first outer electrode 20, and a second end of the coil 40 is connected to the second outer electrode 30.

The coil 40 includes a coil portion 40*a* that concentrates the magnetic flux generated by the current input or output via the first outer electrode 20 and the second outer electrode 30 and that generates a large inductance. The coil 40 also includes a first extended conductor layer 40*b* and a second extended conductor layer 40*c*. The first extended conductor layer 40*b* connects one end of the coil portion 40*a* to the first outer electrode 20, and the second extended conductor layer 40*c* connects the other end of the coil portion 40*a* to the second outer electrode 30.

As illustrated in FIG. 4 and FIG. 5, the coil portion 40*a* includes a plurality of coil conductor layers 41 to 48 aligned in the width direction W inside the device body 10 and via conductor layers 51 to 57 each electrically connecting corresponding ones of the coil conductor layers 41 to 48 to each other in the width direction W inside the device body 10. As illustrated in FIG. 4 and FIG. 5, each of the coil conductor layers 41 to 48 is a conductor layer formed into a spiral wound more than one turn along the main surface of a corresponding one of the insulator layers 63*a* to 63*h* in the device body 10. As used herein, the spiral shape means a shape formed along a plane and is differentiated from a three-dimensional helical shape. FIG. 4 illustrates the outward shape of the insulator layers 60 (63*a* to 63*h*) in two-dot chain lines.

As illustrated in FIG. 4, each of the coil conductor layers 41 to 48 according to the present embodiment is formed in a spiral extending substantially along two annular tracks O1 and O2. Accordingly, the number of turns of each of the coil conductor layers 41 to 48 according to the present embodiment is more than one and two or less (i.e., from more than one to two). However, the number of turns of each of the coil conductor layers 41 to 48 has only to be more than one and may be more than two. In the present embodiment, the annular tracks O1 and O2 each are rectangular. As illustrated in FIG. 4, the coil conductor layers 41 to 48 partially superpose each other when viewed in the width direction W to form two annular tracks O1 and O2. The condition denoted by "superposing each other" herein includes a case in which the portions of the coil conductor layers 41 to 48, which are to be superposed, slightly deviate from each other due to variations arising in a manufacturing process. The shape of the coil portion 40*a* (the shape of the tracks O1 and O2) may be rectangular, as mentioned above, or may be polygonal, circular, or elliptical, or a combination of a plurality of such shapes. The shape of the outer peripheral track O1 and the shape of the inner peripheral track O2 may differ from each other.

As illustrated in FIG. 4 and FIG. 5, the coil conductor layers 41 to 48 are electrically connected in series to each other via the via conductor layers 51 to 57 extending through the insulator layers 63*b* to 63*h* in the width direction W. In FIG. 4 and FIG. 5, the via conductor layers 51 to 57 are illustrated by dotted chain lines between the coil conductor layers 41 to 48.

Examples of materials for each of the coil conductor layers 41 to 48, the via conductor layers 51 to 57, the first extended conductor layer 40*b*, and the second extended conductor layer 40*c* are conductive materials such as metals having low electrical resistance such as silver (Ag), copper (Cu), and gold (Au), or alloys or the like containing mainly the above metals. Each of the outer conductor layers 23 and 33 is formed of, for example, conductive materials such as metals having low electrical resistance such as silver (Ag), copper (Cu), and gold (Au), or alloys or the like containing mainly the above metals. In addition, glass may be contained in such conductive materials in a dispersed manner.

As illustrated in FIG. 2 and FIG. 3, the coil portion 40*a* and the first and second extended conductor layers 40*b* and 40*c* as a whole form a structure that is rotationally symmetrical (180 degrees rotation) relative to an axis extending from the center of the mounting surface 11 in a direction orthogonal to the mounting surface 11. Thus, similar characteristics can be obtained, even when the connection relations between a set of the first outer electrode 20 and a wiring on the board to which the first outer electrode 20 is to be connected and a set of the second outer electrode 30 and a wiring on the board to which the second outer electrode 30 is to be connected are reversed.

The coil conductor layers will be described in detail.

In the present embodiment, the coil conductor layers 41 to 48 of the insulator layers 63*a* to 63*h* illustrated in FIG. 4 and FIG. 5 are all formed based on a similar technical concept. Accordingly, one coil conductor layer, for example, the coil conductor layer 48 of the insulator layer 63*h* will be described in detail herein and the figures and descriptions of the coil conductor layers 41 to 47 will be omitted.

Figure 6:
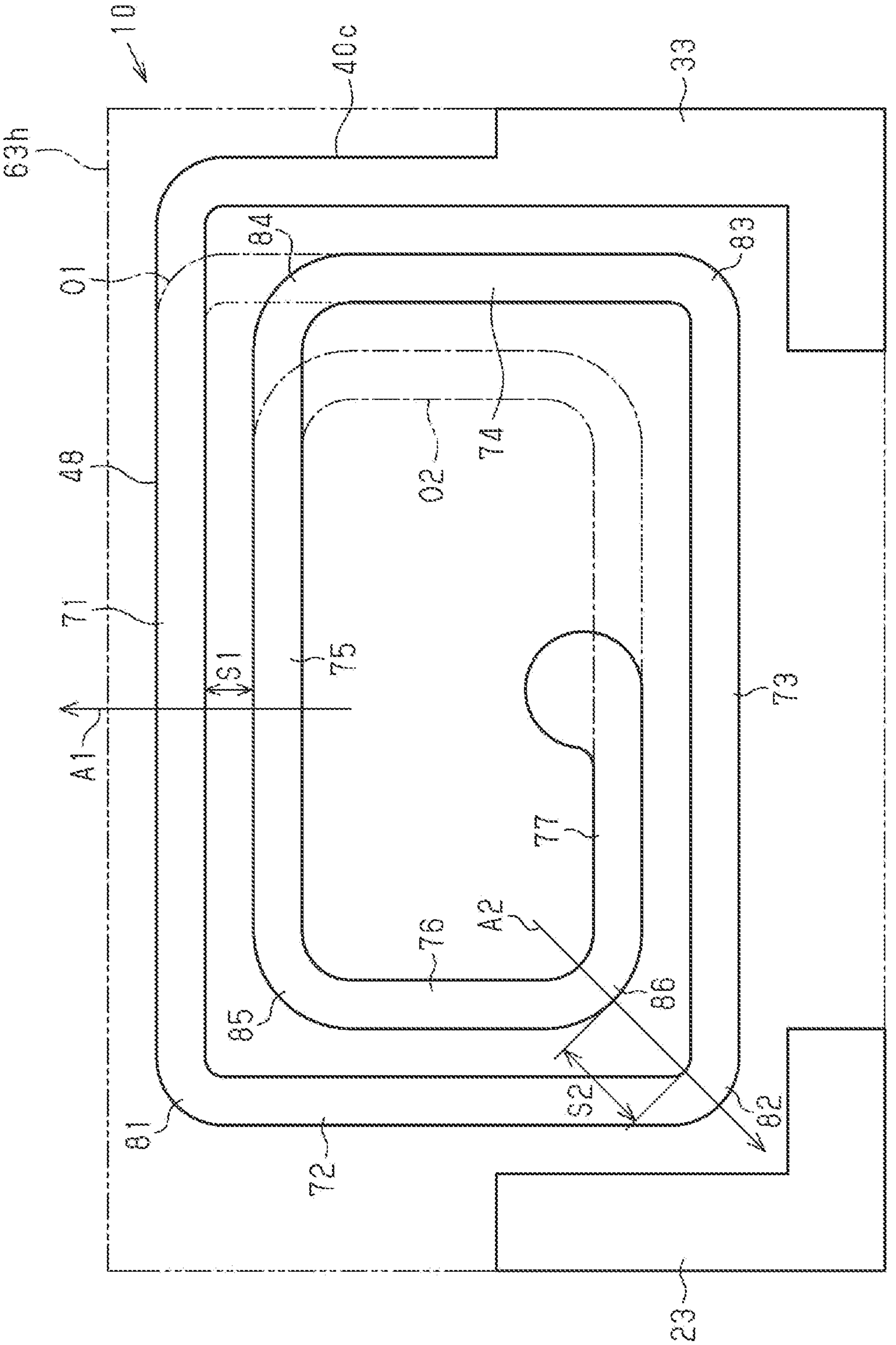
FIG. 6 is a plan view of one of the insulator layers in which a coil conductor layer and outer electrode layers are illustrated.

FIG. 6 illustrates the coil conductor layer 48, the second extended conductor layer 40*c*, and the respective outer conductor layers 23 and 33 on the main surface of the insulator layer 63*h*.

The coil conductor layer 48 includes a plurality of straight portions 71, 72, 73, 74, 75, 76, and 77 and curved portions (corner portions) 81, 82, 83, 84, 85, and 86 each provided between corresponding ones of the straight portions 71, 72, 73, 74, 75, 76, and 77. The straight portions 71, 73, 75, and 77 extend in the length direction L of the device body 10. The straight portions 72, 74, and 76 extend in the height direction T of the device body 10. In other words, each of the straight portions 71, 73, 75, and 77 and each of the straight portions 72, 74, and 76 extend in the respective directions (the length direction L and the height direction T) orthogonal to each other.

The straight portions 71, 72, 73, and 74 form a portion of the outer peripheral track O1 and the straight portions 75, 76, and 77 form a portion of the inner peripheral track O2. However, a portion of the straight portion 75 forms a portion of the inner peripheral track O2, and an end portion of the straight portion 75 is connected to the straight portion 74 on the outer peripheral track O1. In other words, the straight portion 75 includes a portion on the inner peripheral track O2 and a portion between the inner peripheral track O2 and the outer peripheral track O1.

In the coil conductor layer 48 according to the present embodiment, the outward shape size can be increased by including the rectangular outer peripheral track O1 (formed of the straight portions 71, 72, 73, and 74 and the curved portions 81, 82, and 83). In addition, in the coil conductor layer 48, the length (wiring length) can be increased by including the rectangular inner peripheral track O2 (formed of a portion of the straight portion 75, the straight portions 76 and 77, and the curved portions 85 and 86). Thus, the Q value of the inductor component 1 is increased.

In the present embodiment, each of the curved portions 81 to 86 is curved so as to continue from the corresponding straight portion to be connected to. In other words, the curved portions 81 to 86 include sides on the inner side of the coil conductor layer 48 and sides on the outer side of the coil conductor layer 48, and each of the sides is formed in an arc that is about one quarter of a circumference of a circle.

Directions from the inner side portion to the outer side portion of the coil conductor layer 48 will be used to describe the wiring portions of the coil conductor layer 48. Hereinafter, portions of the coil conductor layer 48 intersecting the rays extending from the inner side portion to the outer side portion of the coil conductor layer 48, that is, in the directions are referred to as wiring portions lying in the directions. Of the wiring portions lying in any of the directions, the wiring portions lying side by side is referred to as adjacent wiring portions in the direction. For example, as illustrated in FIG. 6, the straight portion 71 on the outer peripheral track O1 and the straight portion 75 on the inner peripheral track O2 are the adjacent wiring portions in a first direction A1 from the inner side portion to the outer side portion of the coil conductor layer 48. Similarly, the curved portion 82 on the outer peripheral track O1 and the curved portion 86 on the inner peripheral track O2 are the adjacent wiring portions in a second direction A2 from the inner side portion to the outer side portion of the coil conductor layer 48, the second direction differing from the first direction A1.

In the present embodiment, a wiring spacing S2 between the curved portions 82 and 86 that are adjacent to each other in the second direction A2 is larger than a wiring spacing S1 between the straight portions 71 and 75 that are adjacent to each other in the first direction A1. A wiring spacing between the curved portions 81 and 85 illustrated in FIG. 6 is also larger than the wiring spacing S1 between the straight portions 71 and 75. In other words, the inductor component 1 includes the spiral coil conductor layer 48 wound more than one turn on the main surface of the insulator layer 63*h*. In the coil conductor layer 48, the wiring spacing S1 between the straight portions 71 and 75 that are two wiring portions adjacent to each other in the first direction A1 differs from the wiring spacing S2 between the curved portions 82 and 86 that are two wiring portions adjacent to each other in the second direction A2.

In a spiral coil conductor layer wound more than one turn as in the coil conductor layer 48 of the inductor component 1, the magnetic flux generated at the outer peripheral track O1 and the magnetic flux generated at the inner peripheral track O2 cancel each other out. Thus, the efficiency in obtaining the L value per area of the main surface of the insulator layer is decreased and the Q value is also decreased compared with a coil conductor layer wound one turn or less. However, in the inductor component 1, because the wiring spacings S1 and S2 differ from each other, the cancelation of the magnetic fluxes between the outer peripheral track O1 and the inner peripheral track O2 can be reduced at least in a region having larger wiring spacing (the curved portions 82, 86). Thus, for example, the efficiency in obtaining the L value relative to a size can be improved in the inductor component 1.

The adjacent wiring portions are not limited to a case in which the shapes of a wiring portion on the outer peripheral track O1 and a wiring portion on the inner peripheral track O2 are the same as in the case of the straight portions 71 and 75 and the curved portions 82 and 86. For example, a wiring portion on the outer peripheral track O1 may be straight, and a wiring portion on the inner peripheral track O2 may be curved.

Manufacturing Method

Next, a manufacturing method of the above-described inductor component 1 will be described with reference to FIG. 5.

First, a mother insulator layer that is to form the insulator layers 61 is formed. The mother insulator layer is a large insulator layer in which a plurality of insulator layers 61, connected to each other, are arranged in a matrix. For example, an insulating paste containing mainly borosilicate glass is applied to a carrier film to form the mother insulator layer that is to form the insulator layers 61. In the present embodiment, an insulating paste having a relative permeability of 2 or less after being fired is used. The insulating paste used for the insulator layers 61 has a color different from the color of an insulating paste used for the insulator layers 62, 63*a* to 63*h*, and 64.

Next, a mother insulator layer that is to form the insulator layers 62 is formed. The insulating paste is applied to the mother insulator layer that is to form the insulator layers 61 to form the mother insulator layer that is to form the insulator layers 62.

Next, a mother insulator layer that is to form the insulator layers 63*a* is formed. The insulating paste is applied to the mother insulator layer that is to form the insulator layers 62 to form the mother insulator layer that is to form the insulator layers 63*a*.

Next, the coil conductor layers 41 and the outer conductor layers 23 and 33 are formed. For example, a conductive paste containing Ag as a main metal component is applied to the mother insulator layer that is to form the insulator layers 63*a* to form a conductive paste layer. At this time, patterning may be performed by printing using a conductive paste and a screen plate in which openings are formed in regions for the coil conductor layers 41 and the outer conductor layers 23 and 33 or may be performed by photolithography using a photosensitive conductive paste. Thus, the coil conductor layers 41 and the outer conductor layers 23 and 33 that have not been fired are formed on the mother insulator layer that is to form the insulator layers 63*a*.

Next, a mother insulator layer that is to form the insulator layers 63*b* is formed. After the insulating paste is applied to the mother insulator layer that is to form the insulator layers 63*a*, the applied insulating paste in regions in which the via conductor layers 51 and the outer conductor layers 23 and 33 are formed is removed by, for example, laser processing or photolithography. Thus, the mother insulator layer that is to form the insulator layers 63*b* is formed in such a manner that through holes are formed at positions corresponding to positions of via pads of the respective coil conductor layers 41, and corner portions corresponding to both outer conductor layers 23 and 33 of the respective coil conductor layers 41 are cut out.

Next, the coil conductor layers 42, the via conductor layers 51, and the outer conductor layers 23 and 33 are formed. As in the case of the above-described coil conductor layers 41, the conductive paste is applied to the mother insulator layer that is to form the insulator layers 63*b* to form a conductive paste layer. At this time, the above-described through holes and cut out portions are filled with the conductive paste. Thus, the unfired coil conductor layers 42, the unfired via conductor layers 51, and the unfired outer conductor layers 23 and 33 are formed on the mother insulator layer that is to form the insulator layers 63*b*.

After the above steps have been performed, the mother insulator layer forming step and the conductive paste layer forming step are alternately repeated in order to form mother insulator layers that are to form the insulator layers 63*c* to 63*h* and in order to form the unfired coil conductor layers 42 to 48, the unfired outer conductor layers 23 and 33, and the unfired via conductor layers 52 to 57.

Next, a mother insulator layer that is to form the insulator layers 64 is formed on the mother insulator layer that is to form the insulator layers 63*h* as in the case of the above-described mother insulator layer that is to form the insulator layers 62. A mother insulator layer that is to form the insulator layers 65 is then formed on the mother insulator layer that is to form the insulator layers 64 as in the case of the above-described mother insulator layer that is to form the insulator layers 61.

Through the above-described steps, a mother multilayer body including a plurality of device bodies 10, connected to each other, which are arranged in a matrix, is obtained.

Next, the mother multilayer body is cut using a dicing machine or the like to obtain individual unfired device bodies 10. In such a cutting step, the outer conductor layers 23 and 33 are exposed from the device body 10 at cut surfaces formed by the cutting. In a firing step described below, the device bodies 10 shrink; thus, the mother multilayer body is cut in consideration of the shrinkage.

Next, the unfired device bodies 10 are fired under predetermined conditions to obtain the device bodies 10. In addition, the device bodies 10 are subjected to barrel finishing. After performing the barrel finishing, the covering layers 22 and 32 for covering the outer conductor layers 23 and 33 are formed. For example, the covering layers 22 and 23 can be formed by electroplating or electroless plating.

Through the above-described steps, the inductor component 1 is completed.

The above-described manufacturing method is an example. To enable the structure of the inductor component 1, other publicly known manufacturing methods may be used instead or may be added. For example, instead of the firing, an insulator layer may be formed of a curable resin, and a coil conductor layer or the like may be formed by plating.

Functions

Next, functions of the above-described inductor component 1 will be described.

As illustrated in FIG. 4 and FIG. 5, the coil conductor layers 41 to 48 are formed in a spiral following the outer peripheral track O1 and the inner peripheral track O2.

As illustrated in FIG. 6, the inductor component 1 includes the substantially rectangular parallelepiped device body 10 including the first lateral surface 13 and includes a plurality of coil conductor layers 41 to 48 that are aligned in a direction orthogonal to the first lateral surface 13 and that are individually formed in a spiral wound more than one turn on the main surface parallel to the first lateral surface 13 inside the device body 10. A wiring spacing (for example, the wiring spacing S1) between two wiring portions adjacent to each other (for example, the straight portions 71, 75) in a direction (for example, the first direction A1) from the inner side portion to the outer side portion of each of the coil conductor layers 41 to 48 differs from a wiring spacing (for example, the wiring spacing S2) of two wiring portions adjacent to each other (for example, the curved portions 82, 86) in a direction (for example, the second direction A2) from the inner side portion to the outer side portion of each of the coil conductor layers 41 to 48. Thus, as described above, the efficiency in obtaining the L value can be improved in the inductor component 1.

In addition, the inductor component 1 preferably has the following configurations.

Figure 7A:
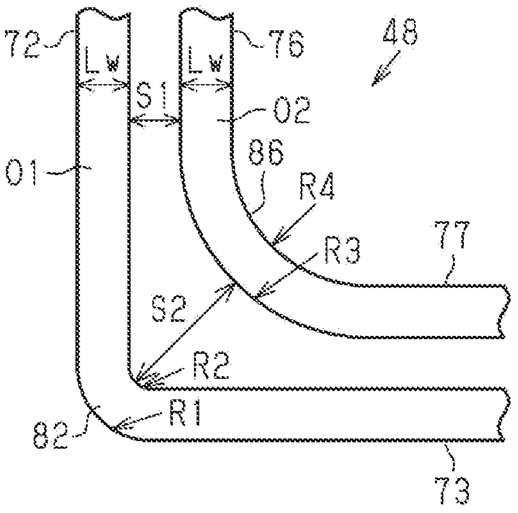
FIG. 7A is a partially enlarged view of the coil conductor layer.
Figure 7B:
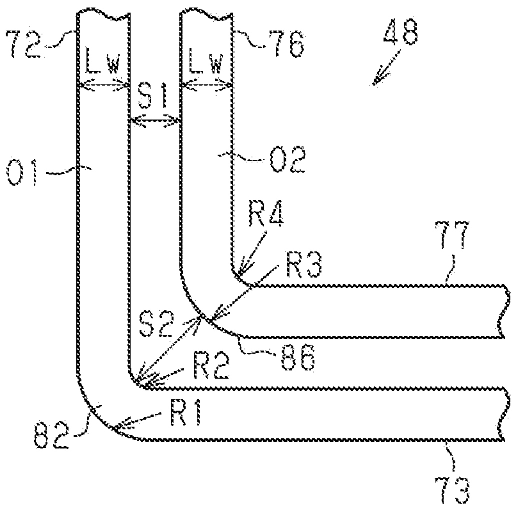
FIG. 7B is a partially enlarged view of a coil conductor layer.

FIG. 7A and FIG. 7B enlarge and illustrate a portion of the coil conductor layer 48.

FIG. 7A illustrates an example in which a radius of curvature R4 of the curved portion 86 on the inner peripheral track O2 is larger than a radius of curvature R2 of the curved portion 82 on the outer peripheral track O1. FIG. 7B illustrates an example in which the radius of curvature R4 of the curved portion 86 on the inner peripheral track O2 is the same as the radius of curvature R2 of the curved portion 82 on the outer peripheral track O1 (the curved portions 82 and 86 have the same shape).

In both of the examples illustrated in FIG. 7A and FIG. 7B, the wiring spacing S2 between the curved portions 82 and 86 is larger than the wiring spacing S1 between the straight portions 72 and 76. Thus, the efficiency in obtaining the L value can be improved as described above.

In the example illustrated in FIG. 7B, by forming the curved portion 86 on the inner peripheral track O2 into the same shape as the shape of the curved portion 82 on the outer peripheral track O1, an inner region of the inner peripheral track O2 can be larger and the perimeter of the inner peripheral track O2 can be increased.

Thus, it can be generally expected that an advantageous effect in which the Q value of the inductor component 1 is improved by increasing the perimeter of the inner peripheral track O2 will be attained. However, the inventors of the present application found that, in a coil conductor layer formed in a spiral wound more than one turn, as in the coil conductor layer 48, an increase in the perimeter of the inner peripheral track O2 increases the proportion of the parallel extending wiring portions, which causes the magnetic fluxes at the adjacent wiring portions to cancel each other out. Thus, the advantageous effect in which the Q value in the inductor component 1 is improved by increasing the perimeter of the inner peripheral track O2 may be more modest than expected.

For this reason, as illustrated in FIG. 7A, the radius of curvature R4 of the curved portion 86 on the inner peripheral track O2 is preferably larger than the radius of curvature R2 of the curved portion 82 on the outer peripheral track O1 in the inductor component 1. The lengths of the straight portions 72 and 76 are decreased in accordance with the difference between the radius of curvature R4 of the curved portion 86 on the inner peripheral track O2 and the radius of curvature R2 of the curved portion 82 on the outer peripheral track O1. Thus, in the outer peripheral track O1 and the inner peripheral track O2, the wiring portions parallel to each other are shortened; thus, the cancelation of the magnetic fluxes between the adjacent wiring portions can be reduced.

As described above, from the perspective of the reduction in the cancelation of the magnetic fluxes between the adjacent wiring portions, the difference between the radius of curvature R4 of the curved portion 86 on the inner peripheral track O2 and the radius of curvature R2 of the curved portion 82 on the outer peripheral track O1 is preferably larger. However, if the difference between the radius of curvature R4 of the curved portion 86 on the inner peripheral track O2 and the radius of curvature R2 of the curved portion 82 on the outer peripheral track O1 is increased, the inner region of the inner peripheral track O2 becomes smaller, and the Q value is reduced. The inventors of the present application observed that characteristics change in accordance with the relation between the radius of curvature R4 of the curved portion 86 on the inner peripheral track O2 and the radius of curvature R2 of the curved portion 82 on the outer peripheral track O1 by manufacturing the inductor component 1 as per the following examples.

Examples

Table 1 shows dimensions of the below-listed portions, the ratio S2/S1 of the wiring spacing S2 to the wiring spacing S1, and the radius of curvature difference R4–R2 in Examples 1 to 6. For description of the dimensions of each portion, the elements (such as the curved portions 82, 86) illustrated in FIG. 7A are used.

TABLE 1

| Examples | Lw [μm] | S1 [μm] | R1 [μm] | R2 [μm] | R3 [μm] | R4 [μm] | S2 [μm] | S2/S1 | R4 – R2 |
|---|---|---|---|---|---|---|---|---|---|
| 1 | 18.9 | 22.0 | 27.3 | 8.4 | 27.3 | 8.4 | 38.9 | 1.8 | 0.0 |
| 2 | 18.9 | 22.0 | 27.3 | 8.4 | 38.9 | 20.0 | 43.7 | 2.0 | 11.6 |
| 3 | 18.9 | 22.0 | 27.3 | 8.4 | 58.9 | 40.0 | 52.0 | 2.4 | 31.6 |
| 4 | 18.9 | 22.0 | 27.3 | 8.4 | 78.9 | 60.0 | 60.3 | 2.7 | 51.6 |
| 5 | 18.9 | 22.0 | 27.3 | 8.4 | 98.9 | 80.0 | 68.6 | 3.1 | 71.6 |
| 6 | 18.9 | 22.0 | 27.3 | 8.4 | 118.9 | 100.0 | 76.9 | 3.5 | 91.6 |

Example 1

In an inductor component of Example 1, a coil conductor layer was set to have a wiring width Lw (μm) of 18.9, a wiring spacing S1 (μm) of 22.0, a radius of curvature R1 (μm) of 27.3, a radius of curvature R2 (μm) of 8.4, a radius of curvature R3 (μm) of 27.3, a radius of curvature R4 (μm) of 8.4, and a wiring spacing S2 (μm) of 38.9. In the inductor component, the ratio S2/S1 of the wiring spacing S2 to the wiring spacing S1 is 1.8, and the difference R4–R2 between the radius of curvature R4 of the curved portion 86 on the inner peripheral track O2 and the radius of curvature R2 of the curved portion 82 on the outer peripheral track O1 is 0.0.

Example 2

In an inductor component of Example 2, a coil conductor layer was set to have a wiring width Lw (μm) of 18.9, a wiring spacing S1 (μm) of 22.0, a radius of curvature R1 (μm) of 27.3, a radius of curvature R2 (μm) of 8.4, a radius of curvature R3 (μm) of 38.9, a radius of curvature R4 (μm) of 20.0, and a wiring spacing S2 (μm) of 43.7. In the inductor component, the ratio S2/S1 of the wiring spacing S2 to the wiring spacing S1 is 2.0, and the difference R4–R2 between the radius of curvature R4 of the curved portion 86 on the inner peripheral track O2 and the radius of curvature R2 of the curved portion 82 on the outer peripheral track O1 is 11.6.

Example 3

In an inductor component of Example 3, a coil conductor layer was set to have a wiring width Lw (μm) of 18.9, a wiring spacing S1 (μm) of 22.0, a radius of curvature R1 (μm) of 27.3, a radius of curvature R2 (μm) of 8.4, a radius of curvature R3 (μm) of 58.9, a radius of curvature R4 (μm) of 40.0, and a wiring spacing S2 (μm) of 52.0. In the inductor component, the ratio S2/S1 of the wiring spacing S2 to the wiring spacing S1 is 2.4, and the difference R4−R2 between the radius of curvature R4 of the curved portion 86 on the inner peripheral track O2 and the radius of curvature R2 of the curved portion 82 on the outer peripheral track O1 is 31.6.

Example 4

In an inductor component in Example 4, a coil conductor layer was set to have a wiring width Lw (μm) of 18.9, a wiring spacing S1 (μm) of 22.0, a radius of curvature R1 (μm) of 27.3, a radius of curvature R2 (μm) of 8.4, a radius of curvature R3 (μm) of 78.9, a radius of curvature R4 (μm) of 60.0, and a wiring spacing S2 (μm) of 60.3. In the inductor component, the ratio S2/S1 of the wiring spacing S2 to the wiring spacing S1 is 2.7, and the difference R4−R2 between the radius of curvature R4 of the curved portion 86 on the inner peripheral track O2 and the radius of curvature R2 of the curved portion 82 on the outer peripheral track O1 is 51.6.

Example 5

In an inductor component in Example 5, a coil conductor layer was set to have a wiring width Lw (μm) of 18.9, a wiring spacing S1 (μm) of 22.0, a radius of curvature R1 (μm) of 27.3, a radius of curvature R2 (μm) of 8.4, a radius of curvature R3 (μm) of 98.9, a radius of curvature R4 (μm) of 80.0, and a wiring spacing S2 (μm) of 66.8. In the inductor component, the ratio S2/S1 of the wiring spacing S2 to the wiring spacing S1 is 3.1, and the difference R4−R2 between the radius of curvature R4 of the curved portion 86 on the inner peripheral track O2 and the radius of curvature R2 of the curved portion 82 on the outer peripheral track O1 is 71.6.

Example 6

In an inductor component in Example 6, a coil conductor layer was set to have a wiring width Lw (μm) of 18.9, a wiring spacing S1 (μm) of 22.0, a radius of curvature R1 (μm) of 27.3, a radius of curvature R2 (μm) of 8.4, a radius of curvature R3 (μm) of 118.9, a radius of curvature R4 (μm) of 100.0, and a wiring spacing S2 (μm) of 76.9. In the inductor component, the ratio S2/S1 of the wiring spacing S2 to the wiring spacing S1 is 3.5, and the difference R4−R2 between the radius of curvature R4 of the curved portion 86 on the inner peripheral track O2 and the radius of curvature R2 of the curved portion 82 on the outer peripheral track O1 is 91.6.

Relation Between Dimensions of a Coil Conductor Layer and Characteristics of an Inductor Component In Examples 1 to 6 described above, the inductor components including the coil conductor layers having the above-described dimensions were manufactured, and the L value and the Q value of each inductor component with respect to an input signal having a frequency of 500 MHz were measured.

Figure 8:
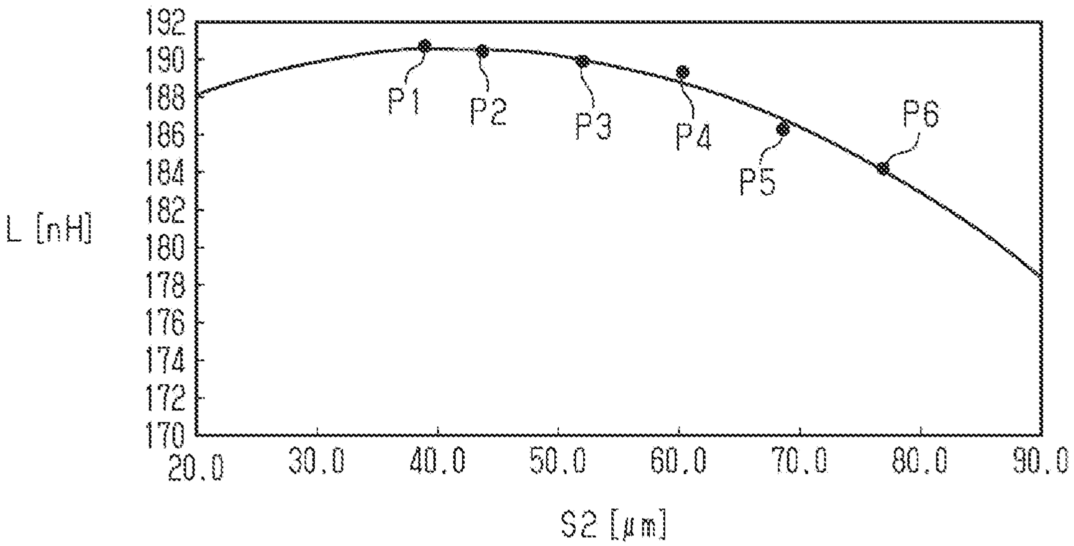
FIG. 8 is a graph showing a relation between a wiring spacing S2 and an L value.

In FIG. 8, points P1 to P6 indicate the measured L values of the respective inductor components of Examples 1 to 6. In the graph of FIG. 8, the horizontal axis indicates the wiring spacing S2 between the curved portions 82 and 86, and the vertical axis indicates the L value.

FIG. 8 shows that, as the wiring spacing S2 between the curved portion 86 on the inner peripheral track O2 and the curved portion 82 on the outer peripheral track O1 increases with respect to the consistent wiring spacing S1 (22.0 μm), the L value increases initially but decreases after the wiring spacing S2 exceeds a certain wiring spacing (S2 is substantially equal to 40.0 μm). Thus, it is revealed that, regarding the L value, an advantageous effect in which the mutual cancelation of the magnetic fluxes is reduced is initially larger compared with an influence caused when the inner region of the coil conductor layer 48 becomes smaller. However, after the wiring spacing S2 exceeds a certain wiring spacing, the influence caused when the inner region of the coil conductor layer 48 becomes smaller is larger compared with the advantageous effect in which the mutual cancelation of the magnetic fluxes is reduced.

Figure 9:
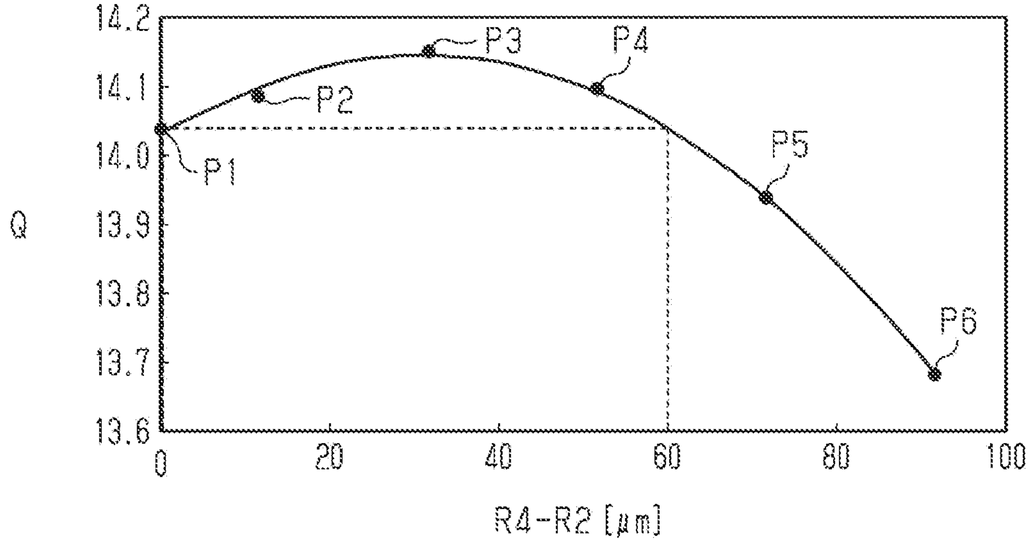
FIG. 9 is a graph showing a relation between a radius of curvature difference R4–R2 and a Q value.

In FIG. 9, points P1 to P6 indicate the measured Q values of the respective inductor components of Examples 1 to 6. In the graph of FIG. 9, the horizontal axis indicates the difference R4−R2 between the radius of curvature R4 of the curved portion 86 on the inner peripheral track O2 and the radius of curvature R2 of the curved portion 82 on the outer peripheral track O1, and the vertical axis indicates the Q value.

As shown in FIG. 9, when the radius of curvature difference R4−R2 is in a range of 0 to 60 μm or less (i.e., from 0 to 60 μm), any Q values equal to or larger than the Q value of the inductor component of Example 1 can be obtained.

Figure 10:
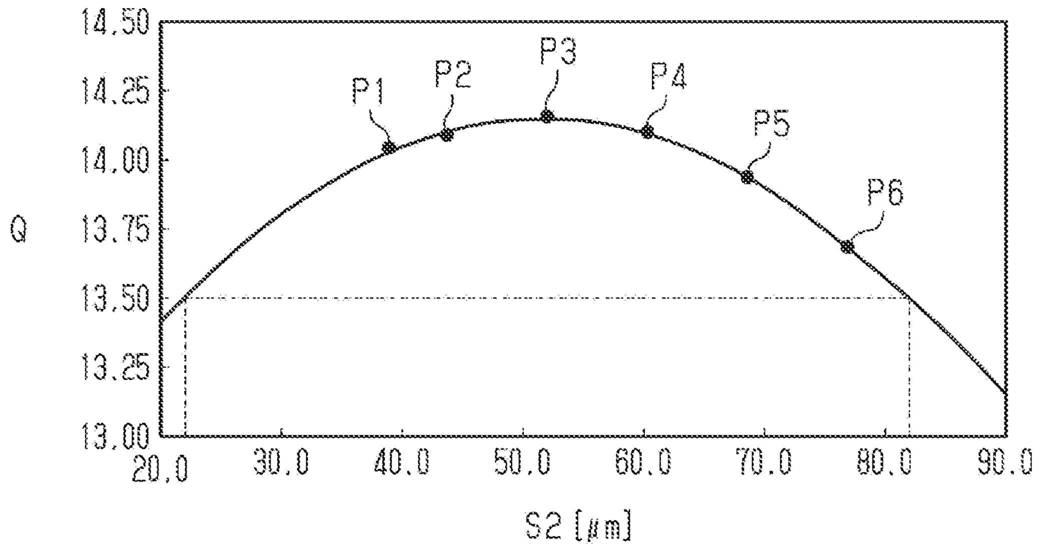
FIG. 10 is a graph showing a relation between the wiring pattern S2 and the Q value.

In FIG. 10, points P1 to P6 indicate the measured Q values of the respective inductor components of Examples 1 to 6. In the graph of FIG. 10, the horizontal axis indicates the wiring spacing S2 between the curved portions 82 and 86, and the vertical axis indicates the Q value. The wiring spacing S2 is larger than the wiring spacing S1; thus, the Q value of the inductor component can be increased. The wiring spacing S2 is preferably 22 μm or more and 82 μm or less (i.e., from 22 μm to 82 μm) from the perspective of the Q value.

Figure 11:
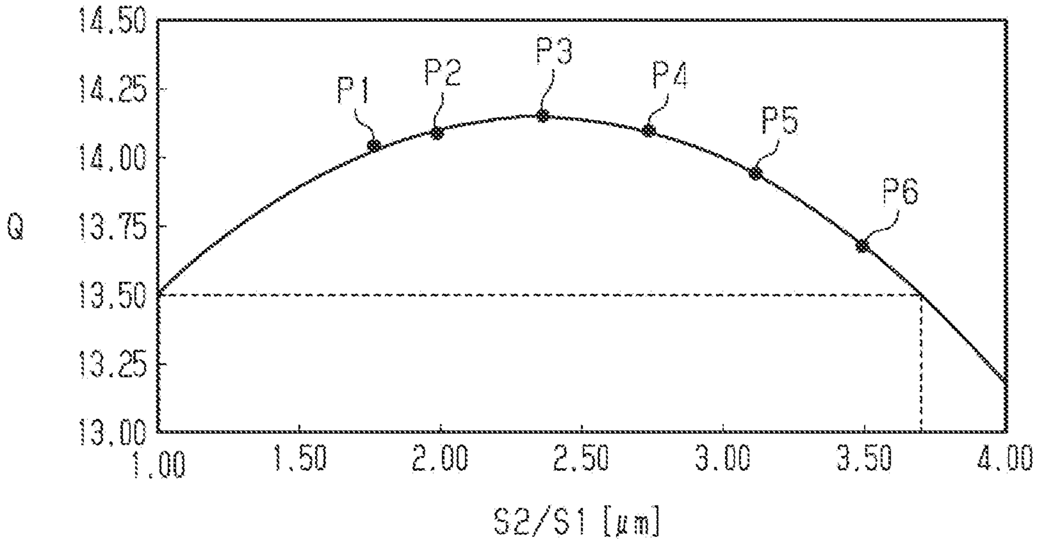
FIG. 11 is a graph showing a relation between the wiring spacing ratio S2/S1 and the Q value.

In FIG. 11, points P1 to P6 indicate the measured Q values of the respective, above-described inductor components of Examples 1 to 6. In the graph of FIG. 11, the horizontal axis indicates the ratio S2/S1 of the wiring spacing S2 between the curved portions 82 and 86 to the wiring spacing S1 between the straight portions 72 and 76, and the vertical axis indicates the Q value. As the ratio S2/S1 increases, the Q value of the inductor component can be increased. The ratio S2/S1 is preferably 1 or more and 3.7 or less (i.e., from 1 to 3.7) from the perspective of the Q value.

As described above, the following advantageous effects are attained according to the present embodiment.

(1) The inductor component 1 includes a substantially rectangular parallelepiped device body 10 including the first lateral surface 13 and includes the coil conductor layers 41 to 48 each formed into a spiral wound more than one turn on the main surface parallel to the first lateral surface 13 inside the device body 10. The wiring spacing S1 between two wiring portions adjacent to each other (the straight portions 71, 75) in the first direction A1 from the inner side portion to the outer side portion of each of the coil conductor layers 41 to 48 differs from the wiring spacing S2 between two wiring portions adjacent to each other (the curved portions 82, 86) in the second direction A2 from the inner side portion to the outer side portion of each of the coil conductor layers 41 to 48.

At each pair of the wiring portions adjacent to each other, the magnetic fluxes generated by currents flowing through the wiring portions cancel each other out. The above configuration includes a portion at which the magnetic flux cancellation between the adjacent wiring portions is reduced because the wiring spacings between the pairs of the adjacent wiring portions differ from each other. Thus, the efficiency in obtaining characteristics is improved.

(2) The number of turns of each of the coil conductor layers 41 to 48 is more than one and less than two (i.e., from more than one to two). The annular tracks O1 and O2 are rectangular. With the straight portions 71 to 77 forming the rectangular outer peripheral track O1 and inner peripheral track O2, the outward shape size of the coil portion 40*a* can be increased, and the length (the perimeter) of the coil portion 40*a* can be increased. In addition, the inner side of the coil portion 40*a* can be larger. Thus, the Q value of the inductor component 1 can be improved.

Modifications

The above-described embodiment may be implemented by adopting the following forms.

The shapes of the tracks O1 and O2 according to the above-described embodiment may be modified as appropriate.

Figure 12A:
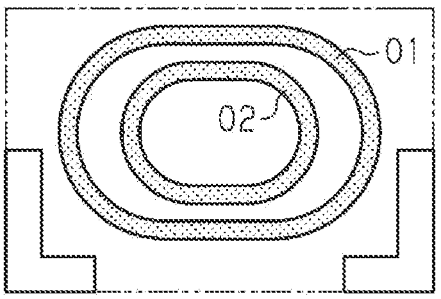
FIG. 12A illustrates a coil conductor layer of a modified inductor component.
Figure 12B:
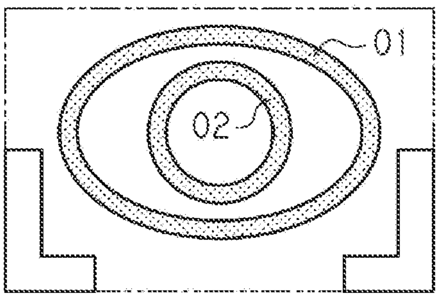
FIG. 12B illustrates a coil conductor layer of a modified inductor component.

As illustrated in FIG. 12A, the outer peripheral track O1 and the inner peripheral track O2 may be oval (a combination of arcs and straight lines). Moreover, as illustrated in FIG. 12B, the outer peripheral track O1 may be elliptical, while the inner peripheral track O2 may be circular. The shapes of the outer peripheral track O1 and the inner peripheral track O2 may be, for example, rectangular, polygonal, oval, or elliptical, or a combination of a plurality of such shapes. Furthermore, the shapes of the outer peripheral track O1 and the inner peripheral track O2 may differ from each other. For example, the outer peripheral track O1 may have a curved shape following the outline of the outer conductor layers, and the inner peripheral track O2 may be circular or elliptical.

In the above-described embodiment, the number of turns of the coil conductor layer has only to be more than one and may be modified to a number more than two, such as three or four, as appropriate. In addition, a single inductor component may include coil conductor layers having different numbers of turns.

In the above-described embodiment, the number of layers of the insulator layer, the coil conductor layer, and the outer conductor layer may be modified as appropriate.

In the above-described embodiment, the underlying layer 21 of the first outer electrode 20 and the underlying layer 31 of the second outer electrode 30 are embedded in the device body 10 but may be provided on the outside of the device body 10.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a rectangular parallelepiped device body including a first lateral surface; and a plurality of coil conductor layers formed into a spiral wound more than one turn on a main surface parallel to the first lateral surface inside the device body; and a via conductor layer connected to an end portion of at least one of the coil conductor layers and electrically connecting the plurality of coil conductor layers, wherein, the at least one of the coil conductor layers includes, when viewed in a direction orthogonal to the first lateral surface, a wiring portion following an annular first track and a wiring portion following an annular second track positioned more inward than the first track, the end portion is on the annular first track, the wiring portion following the first track has a shape including a first straight portion, the wiring portion following the second track has a shape including a second straight portion, a connection portion connecting the first straight portion and the second straight portion of the at least one of the coil conductor layers is adjacent to the end portion without interposing any other wiring portion, and tilts to the first straight portion and the second straight portion so as to be away from the end portion, in the coil conductor layer, a wiring spacing between two wiring portions adjacent to each other in a first direction from the connection portion to the end portion differs from a wiring spacing of two wiring portions adjacent to each other in a second direction from an inner side portion of the coil conductor layer to an outer side portion of the coil conductor layer, the second direction differing from the first direction, and the two wiring portions adjacent to each other in the second direction are arc-shaped, curved portions, and a radius of curvature of the curved portion on an inner side is larger than a radius of curvature of the curved portion on an outer side.

2. The inductor component according to claim 1, wherein the first track has a shape including two or more first straight portions and a first corner portion connecting the first straight portions; and, the second track has a shape including two or more second straight portions and a second corner portion connecting the second straight portions.

3. The inductor component according to claim 2, wherein the wiring portion following the second track includes two or more second straight portions parallel to the first straight portions.

4. The inductor component according to claim 3, wherein a first wiring spacing between each of the first straight portions and the second straight portions corresponding thereto is equal to or smaller than a second wiring spacing between the first corner portion and the second corner portion.

5. The inductor component according to claim 4, wherein the second wiring spacing is from 22 μm to 82 μm.

6. The inductor component according to claim 4, wherein a ratio S2/S1 of the second wiring spacing S2 to the first wiring spacing S1 is from 1 to 3.7.

7. The inductor component according to claim 1, wherein a difference between the radius of curvature of the curved portion on the inner side and the radius of curvature of the curved portion on the outer side is from 0 to 60 μm.

8. The inductor component according to claim 5, wherein a ratio S2/S1 of the second wiring spacing S2 to the first wiring spacing S1 is from 1 to 3.7.

9. The inductor component according to claim 1, wherein the end portion has a part that projects toward the connection portion.

10. The inductor component according to claim 9, wherein the first track has a shape including two or more first straight portions and a first corner portion connecting the first straight portions; and, the second track has a shape including two or more second straight portions and a second corner portion connecting the second straight portions.

11. The inductor component according to claim 10, wherein the wiring portion following the second track includes two or more second straight portions parallel to the first straight portions.

12. The inductor component according to claim 11, wherein a first wiring spacing between each of the first straight portions and the second straight portions corresponding thereto is equal to or smaller than a second wiring spacing between the first corner portion and the second corner portion.

13. The inductor component according to claim 12, wherein the second wiring spacing is from 22 μm to 82 μm.

14. The inductor component according to claim 13, wherein a ratio S2/S1 of the second wiring spacing S2 to the first wiring spacing S1 is from 1 to 3.7.

15. The inductor component according to claim 12, wherein a ratio S2/S1 of the second wiring spacing S2 to the first wiring spacing S1 is from 1 to 3.7.

* * * * *